Sept. 21, 1926.
H. G. TRENCH
SPRING SHACKLE UNIT
Filed Nov. 28, 1923
1,600,495
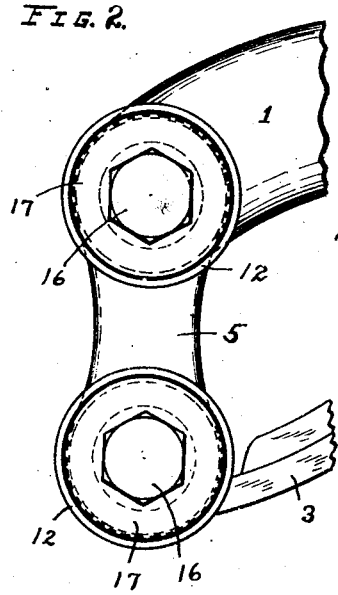
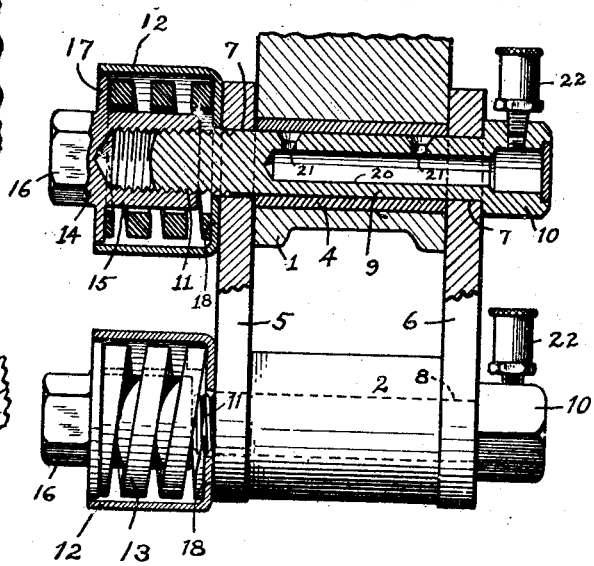
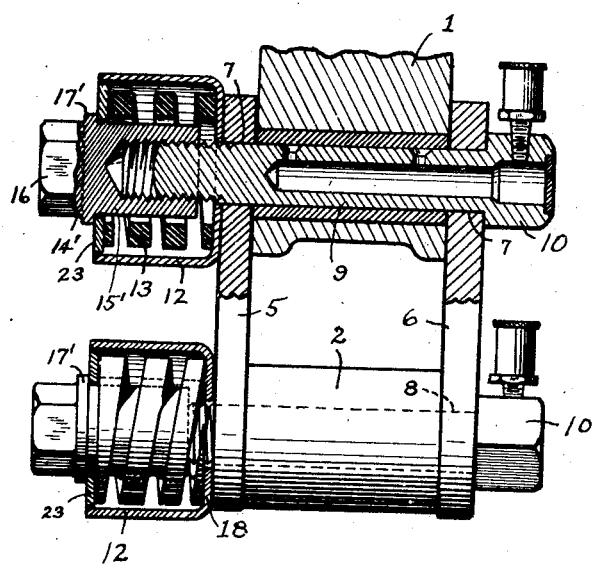
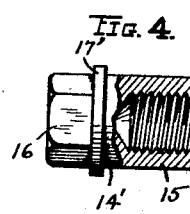
Inventor
Harry G. Trench
Lloyd L. Evans
By
Attorney Patented Sept. 21, 1926.

1,600,495

UNITED STATES PATENT OFFICE.

HARRY G. TRENCH, OF SPRINGFIELD, MASSACHUSETTS.

SPRING-SHACKLE UNIT.

Application filed November 28, 1923. Serial No. 677,369.

This invention relates to shackling units and more particularly to a means for quieting the spring shackling of motor vehicles.

It has been realized for some time that it is highly desirable to improve the spring shackling of automotive vehicles by interposing springs between the shackle blots and nuts and the shackle plates, and one early construction for doing this is shown in my Patent No. 1,042,173, issued October 22, 1912. When such a construction is provided, the connections between the vehicle springs and frames will be such as to permit relative movement of the parts and at the same time preclude rattling or slapping of the parts under normal operation, thus ensuring quiet operation of the spring shackling of motor vehicles.

Improvements have been made on the construction shown in my patent referred to, such improvements comprising a special bolt of greater length than the customary bolt so that a helical spring and housing therefor may come between the shackle plate and the nut. It is now the practice of some automotive vehicle manufacturers to install such devices on all passenger cars which they manufacture. This practice, however, is relatively recent and when these devices are installed in the automotive vehicle it is of course easy to supply special shackle bolts longer than those primarily used for vehicles without these devices. There are, however, a great number of automotive vehicles in operation which do not have any such quieting devices to improve the operation of the shackle unit, and which have a standard, relatively short shackle bolt so that these earlier devices just referred to are not adapted to be applied to vehicles which do not have special bolts.

It is an object of the present invention to provide a construction which may be easily applied to automotive vehicles which have been manufactured and provided with the usual form of shackle bolts which do not extend beyond the shackle plates sufficiently to receive the earlier quieting devices above mentioned.

A further object of my invention is to provide a construction which will be durable and relatively cheap, and which is easily assembled and applied to shackle constructions of automotive vehicles having such relatively short shackle bolts. My devices may be put up conveniently in sets for any given motor vehicle using standard, and therefore relatively short, bolts, and may be distributed advantageously in such sets by distributors and dealers in automotive specialties and supplies, including garages.

These and other objects will be apparent from the following description and annexed drawings, in which—

Figure 1 is a rear elevation, partly in section, of a spring shackle construction embodying my invention.

Fig. 2 is an end elevation.

Fig. 3 is a rear elevation partly in section of a modified form of construction.

Fig. 4 is a view partly in section of a special form of nut used in the construction shown in Fig. 3.

Fig. 5 is a section of a washer to be used with the nut.

In the drawings, 1 indicates a motor vehicle frame of any suitable construction and 2 indicates a tubular portion or eye of the end of the spring 3. The tubular portion of the frame member 1 may be suitably bushed with a bushing 4, if desired. A pair of shackle plates 5, 6, provided with upper and lower holes 7, 8, are placed with the holes in alignment with the tubular portion of the frame and spring, respectively. The bolts 9 each have a head 10 and screw threaded portions 11. One of these bolts is extended through the holes 7 of the shackle plates and the tubular end of the frame, and the other bolt is extended through the holes 8 of the shackle plates and the tubular end 2 of the spring. The free end of each bolt extends beyond the outer wall of the shackle plate for a sufficient distance to receive an ordinary nut and washer (not shown), such as is now commonly used on automotive vehicles.

My device preferably comprises a unit to replace the ordinary nut and washer on shackle construction. The unit consists of a casing or housing 12, a spring 13 and a special nut 14. The nut 14 comprises an internally threaded extension sleeve 15, a polygonal head 16 and a shoulder or collar 17. The casing or housing may be formed in various ways but preferably comprises a cup-shaped member having one end open and the other end apertured to engage the threaded shackle bolt and form a seat for one end of the spring. It need, however, comprise only a tubular member preferably with an end portion to be engaged by one end of the spring so that it will be tightly held in place. The shoulder 17 of the nut is preferably of a size to engage and form a seat for the other end of the spring 13, so that upon rotation of the nut in a direction to move toward the shackle plate the spring may be compressed. When a casing is used and its open end extends toward the shackle plate, the shoulder 17 of the nut is preferably of a size to substantially close the open end of the casing. The casing and collar carried by the nut render the shackle unit when secured to the shackle bolt of a vehicle substantially dust proof and lubricant tight, which is preferable, but can of course be omitted if desired.

The coiled spring 13 is adapted to surround the sleeve 15 and the bolt 9 and to be clamped between the shackle plate and the shouldered head of the nut or other means actuated by the nut to compress the spring. This spring is preferably relatively heavy and capable of withstanding considerable loads, depending upon the thrusts to which it is subjected. For example, in practice I may use a spring capable of withstanding loads considerably upwards of 225 pounds to the square inch. By screwing up the nuts 14, the shackle plates will be drawn into snug engagement with the walls of the frame and spring, and the springs 13 will be put under compression so as to insure that all parts of the mechanism will, under all ordinary operating conditions, be held up in proper operating relationship to each other, and in such a manner that there will be no rattling of such parts or noise due to slapping together of the parts in the motor vehicle.

Each bolt 9 may be provided with a usual lubricating system as by means of the hole 20 formed in the bolt head communicating with ducts 21. A suitable grease cup or filling member 22 of any well known character may be secured to the bolt head in communication with the hole 20.

In the modification shown in Figs. 3, 4 and 5 the nut 14', instead of having a collar or shoulder 17' made integral therewith and of such a diameter that it forms a seat for the spring or substantially close one end of the casing 12, is provided with a relatively small shoulder or collar 17', and I provide in conjunction therewith a washer 23 or the like to form such a seat or closure. The nut 14' is provided with a sleeve 15', similar to the nut 14, to engage the threaded end of the bolt 9 as above described.

It will also be seen that my devices will be formed applicable for use in connection with most types of H shaped shackles, merely by cutting through the cross member of the H so as to separate the connected plates a suitable distance to allow come and go between them. In this way at relatively nominal expense the quiet shackling of motor vehicles thus spring suspended may be effectively and quickly accomplished.

Furthermore it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A shackle unit for attachment to spring shackles comprising a nut having a polygonal head portion and an internally threaded sleeve portion adapted to engage the threaded portion of a bolt and space the head portion of the nut from the threaded end portion of the bolt, a spring to surround said sleeve, and means carried by the head portion of the nut to compress the spring when the nut is rotated on the threaded end of the bolt in a direction to move toward the bolt.

2. A shackle unit for attachment to spring shackles comprising a member having a polygonal head and an internally threaded sleeve to engage the threaded end of a shackle bolt, a spring to surround said sleeve, a casing to enclose the spring, and means carried by said member to compress the spring upon rotation of said member in a direction to move toward said bolt.

3. A shackle unit for attachment to spring shackles comprising a nut having a head and a threaded sleeve, a helical spring to surround said sleeve, an annular member carried by said nut for compressing the spring, and a substantially cylindrical casing to surround said spring, one end of said casing being adapted to form a seat for one end of the spring.

4. A shackle unit for attachment to spring shackles comprising a nut having a head and a sleeve, a spring to surround said sleeve, a casing to surround said spring, and means actuated by the nut to close one end of the casing and compress the spring upon tightening the nut.

5. A shackling unit for attachment to spring shackles comprising a nut having a head and an internally threaded sleeved extension to engage the threaded end of a shackle bolt, a spring to surround said sleeve, a casing to enclose the spring and having one end open, said casing having an aperture in its other end to engage the shackle bolt, and means carried by the nut to close the open end of said casing.

6. A shackling unit for attachment to spring shackles comprising a nut having a head and an internally threaded sleeved extension to engage the shackle bolt, a spring to surround said sleeve, an open end casing to enclose the spring, said casing having one end adapted to form a seat for one end of the spring, a shoulder carried by said nut, and a member adapted to close said casing and to form a seat for the other end of the spring.

7. The combination with a spring shackle mechanism comprising a shackle plate disposed adjacent a vehicle frame and spring, and a shackle bolt having a threaded end portion extending through said shackle plate a sufficient distance to receive a nut, of a shackle unit for such mechanism including a nut having a shouldered head portion and an internally threaded sleeve portion adapted to engage the threaded portion of said bolt and space the shouldered head portion from the threaded end portion of said bolt, and a spring disposed around said sleeve and between the shackle plate and said shouldered head portion.

8. The combination with a spring shackle mechanism comprising a shackle plate disposed adjacent a vehicle frame and spring, and a shackle bolt having a threaded end portion extending through said shackle plate a sufficient distance to receive a nut, of a shackle unit for such mechanism including a nut having a head portion and an internally threaded sleeve portion adapted to engage the threaded portion of said bolt and space the head portion from the threaded end portion of said bolt, a spring disposed around said sleeve and between the shackle plate and said head portion, and means to enclose said spring.

In testimony whereof, I hereunto affix my signature.

HARRY G. TRENCH.